United States Patent Office 3,663,627
Patented May 16, 1972

3,663,627
1-INDANMETHANOLS
Peter Frederick Juby and Thomas William Hudyma, DeWitt, and Richard Anthony Partyka, Liverpool, N.Y., assignors to Bristol-Myers Company, New York, N.Y.
No Drawing. Filed June 1, 1970, Ser. No. 42,457
Int. Cl. C07c 35/22
U.S. Cl. 260—618 F          8 Claims

ABSTRACT OF THE DISCLOSURE

5 - cyclohexyl-1-indanmethanols are useful anti-inflammatory agents in the treatment of inflammatory diseases in animals, including man. An example of a compound of the disclosure is 5-cyclohexyl-1-indanmethanol.

BACKGROUND OF THE INVENTION (1) Field of the invention

The compounds of the present invention relate to 5-cyclohexyl-1-indanmethanols, which compounds are useful non-steroidal anti-inflammatory agents.

(2) Description of the prior art

The compounds 4 - isobutylphenylacetic acid [South African Pat. 62/294 (1962)], 4-isobutyl-α-methyl-phenyl-acetic acid [S. S. Adams, E. E. Cliffe, B. Lessel, and J. S. Nicholson, J. Pharm. Sci., 56, 1686 (1967)], 3-chloro-4-cyclohexyl-α-methylphenyl-acetic acid [T. Y. Shen, Chim, Therap., II, 459, (1967)], and 5-p-methoxyphenyl-2-indancarboxylic acid [M. Minssen-Guetté, M. Dvolaitzky, and J. Jacques, Bull Soc. Chim. France, No. 5, 2111 (1968)] have been described in the literature as being useful anti-inflammatory agents.

Compounds having the formula

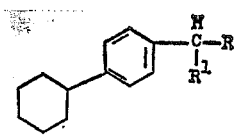

in which R is —CO$_2$H, —CHO or —CH$_2$OH and R$^1$ is H or alkyl have been reported as anti-inflammatory agents by Merck & Co. in U.S. Pat. No. 3,452,079 and Eire Pats. 705/68 and 704/68.

SUMMARY OF THE INVENTION

The 5-cyclohexyl-1-indanmethanols of the present invention are compounds having the formula

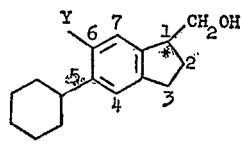

wherein Y is hydrogen, Cl, Br, F, I, OH, (lower)alkyl, mercapto, (lower)alkoxy, amino or (lower)alkylthio.

DISCLOSURE OF THE INVENTION

This invention relates to non-steroidal anti-inflammatory agents useful in animals, including man, which compounds are characterized by the formula

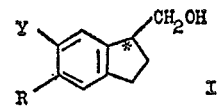

in which R is cyclohexyl, Y is hydrogen, bromo, chloro, iodo, fluoro, mercapto, hydroxy, trifluoromethyl, (lower)alkyl, (lower)alkoxy, amino or (lower)alkylthio. The methanol group in the compounds of the instant invention is attached to an asymmetric carbon atom (*) such that the compounds exist in two isomeric forms, dextro- and levorotatory isomers. Both the substantially pure dextro- and levorotatory isomers of these compounds, as well as the racemic mixtures are considered to be an integral part of the invention.

It was an object of the instant invention to prepare non-steroidal anti-inflammatory agents that would be useful in the treatment of a variety of inflammatory diseases such as rheumatoid arthritis, rheumatoid spondylitis, osteoarthritis, gout and other similar afflictions.

These objectives have been achieved by the provision, according to the present invention, of the compound having the formula

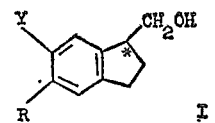

in which R is cyclohexyl; Y is H, Cl, Br, F, mercapto, —CF$_3$, OH, (lower)alkoxy, amino, (lower)alkyl or (lower)alkylthio.

A more limited and preferred embodiment of the present invention comprises the compound having the Formula I wherein R is cyclohexyl, Y is hydrogen, chloro, fluoro, hydroxy, (lower)alkyl, (lower)alkoxy or amino.

A further limited and preferred embodiment of the present invention comprises the compound having the Formula I wherein R is cyclohexyl, Y is hydrogen, chloro, (lower)alkyl or (lower)alkoxy.

A most preferred embodiment of the present invention comprises the compound having the Formula I wherein R is cyclohexyl and Y is hydrogen or chloro.

Another most preferred embodiment is the levorotatory isomer having the name (—) - 5 - cyclohexyl-1-indan-methanol.

Another most preferred embodiment is the dextrorotatory isomer having the name (+)-6-chloro-5-cyclohexyl-1-indanmethanol.

The term "(lower)alkyl" as used herein means both straight and branched chain aliphatic hydrocarbon radicals having from 1 to 6 carbon atoms such as methyl, ethyl, propyl, isopropyl, butyl, isobutyl, etc. Similarly, where the term "(lower)" is used as part of the description of another group, e.g. "(lower)alkoxy," it refers to the alkyl portion of such group which is therefore as described above in connection with "(lower)alkyl" and thus includes such radicals as methoxy, ethoxy, isopropoxy, etc.

The compounds of the instant invention can be prepared by the following synthesis:

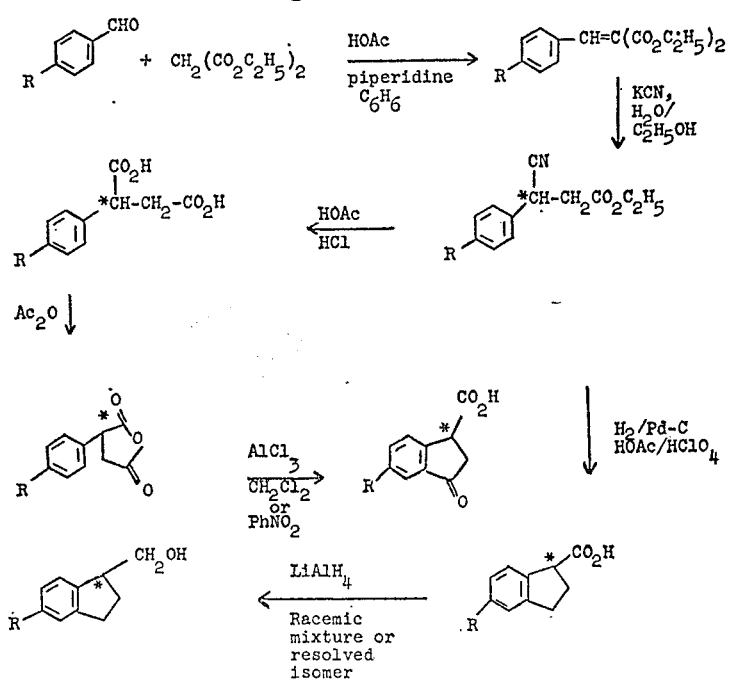

wherein R is cyclohexyl.

The optionally Y-substituted 5-cyclohexyl-1-indancarboxylic acid intermediates can be prepared by one of synthetic routes:

1(a) 6-halosubstituted -1-indancarboxylic acids.—5-cyclohexyl-1-indancarboxylic acid is halogenated with N-halosuccinimide to produce 6-halo-5-cyclohexyl-1-indancarboxylic acids (see Example 3).

(b) 4 or 6-nitrosubstituted-1-indancarboxylic acids.—5-cyclohexyl-1-indancarboxylic acid is nitrated with one equivalent of nitric acid in the presence of sulfuric acid to produce a mixture of 4 and 6-nitro-5-cyclohexyl-1-indancarboxylic acids. The mixture can be resolved into pure 4-nitro-5-cyclohexyl-1-indancarboxylic acid and 6-nitro-5-cyclohexyl-1-indancarboxylic acid by methods known to the art. These resolved 6-nitrosubstituted compounds are most valuable as intermediates in the preparation of other intermediates.

(c) 6-aminosubstituted-1-indancarboxylic acids.—The purified 6-nitrosubstituted indancarboxylic acids obtained in part "(b)" above are reduced by the use of hydrogen and catalyst (Pd/C, PtO₂, etc.) to produce the 6-aminosubstituted indancarboxylic acid intermediates.

(d) 1-indancarboxylic acid diazonium salts.—The aminosubstituted compound prepared in step "(c)" above is placed in a strong mineral acid, i.e., HCl, H₂SO₄, HBr, etc., at 0° C. Nitrous acid is generated in situ by the addition of sodium nitrite to produce the diazonium salt of the amine.

(e) 6-hydroxy-5-cyclohexyl-1-indancarboxylic acid.—Heating of the 6-diazonium salt obtained in step "(d)" after the addition of water, will result in the formation of the 6-hydroxy-5-cyclohexyl-1-indancarboxylic acid.

(f) 6-alkoxy-5-cyclohexyl - 1 - indancarboxylic acid.—Heating of the 6-diazonium salt obtained in step "(d)" after the addition of the appropriate alcohol will result in the formation of the 6-alkoxy compound.

(g) 6-halo-5-cyclohexyl-1-indancarboxylic acid.—The 6-diazonium salt prepared as in step "(d)" from the 6-aminosubstituted-1-indancarboxylic acid obtained in step "(c)" is treated with either cooper-bronze (Gattermann Reaction) or cuprous halide (Cl, Br, I) to produce the 6-halosubstituted compound.

(h) 6-cyano-5-cyclohexyl-1-indancarboxylic acid.—The 6-diazonium salt obtained by the procedure of step "(d)" which is prepared in H₂SO₄ is treated with base to neutralize the salt solution, followed by the addition of a solution of cuprous cyanide-sodium cyanide complex to produce a precipitate. Heating of the precipitate decomposes it to the cyanosubstituted acid.

(i) 6-fluoro-6-cyclohexyl-1-indancarboxylic acid.—The 6-diazonium salt, as in step "(g)," is treated with fluoroboric acid. The fluoroborate precipitates and is collected. After washing and drying, the precipitate is heated and it decomposes to the desired 6-fluorosubstituted compound.

(j) 6-mercapto - 5 - cyclohexyl - 1 - indancarboxylic acid.—The 6-diazonium salt prepared in step "(d)" is treated with potassium ethyl xanthate which produces an ethyl dithiocarbonate. Saponification of the dithiocarbonate produces the desired 6-mercaptosubstituted compound.

(k) 6 - methylthio - 5 - cyclohexyl - 1 - indancarboxylic acid.—Treatment of the 6-mercaptosubstituted compound obtained in step "(j)" with dimethylsulfate in the presence of a base, followed by mild hydrolysis, produces the 6-methylthiosubstituted acid.

(l) 6 - methyl - 5 - cyclohexyl - 1 - indancarboxylic acid.—The 6-bromo- or iodo-5-cyclohexyl-1-indancarboxylic acid obtained in step "(g)" is treated with lithium dimethylcopper to produce 6-methyl - 5 - cyclohexyl-1-indancarboxylic acid [E. J. Corey and G. H. Posner, J. Am. Chem. Soc., 89, p. 3911 (1967)].

The above acids are then reduced to the methanol derivative by reduction with lithium aluminum hydride to produce the compounds of the instant invention.

The compounds of the instant invention can be resolved into their substantially pure dextro- and levorotatory isomers by methods commonly known in the art via the carboxylic acid prior to reduction to the methanol. For illustrative purposes, the compound 5-cxclohexyl-1-indancarboxylic acid was resolved into its respective isomers by the procedure of first treating the mixture with cinchonidine to produce the cinchonidine salt of (+)-5-cyclohexyl-1-indancarboxylic acid. The salt was recrystallized and then decomposed to the free acid to yield substantially pure (+)-5-cyclohexyl-1-indancarboxylic acid.

The levorotatory acid enriched mother liquors remaining above, after the collection of the cinchonidine salt of the dextrorotatory acid was isolated from it, was concentrated to dryness. The residue was treated with ether and hydrochloric acid. A partially resolved mixture of the dextrorotatory and levorotatory isomers, enriched with the levorotatory acid, was obtained.

The enriched acid was dissolved in ethanol and treated with dehydroabietylamine. The dehydroabietylamine salt of (−)-5-cyclohexyl-1-indancarboxylic acid was collected and purified by crystallization. The salt was treated with hydrochloric acid, and extracted with ether. The ethereal solution was concentrated to dryness and substantially pure levorotatory isomer crystallized from petroleum ether. (See Example 4.)

These carboxylic acids can be resolved into their component dextrorotatory and levorotatory isomers by a procedure similar, if not identical, to that described above. Examination of the chemical literature likewise provides many other methods for the resolution of racemic monocarboxylic acids.

Some racemic mixtures can be precipitated as eutectics instead of mixed crystals and can thus be quickly separated and in such cases can sometimes be selectively precipitated. The more common method of chemical resolution may be used. By this method diastereoisomers are formed from the recemic mixture by reaction with an optically-active resolving agent. Thus, an optically-active base can be reacted with the carboxyl group. The difference in solubility between the diastereoisomers formed permits the selective crystallization of one form and regeneration of the optically-active acid from the mixture. There is, however, a third method of resolving which shows great promise. This is one of the other forms of biochemical procedures using selective enzymatic reaction. Thus, the racemic acid can be subjected to an asymmetric oxidase or decarboxylase which will, by oxidation or decarboxylation, destroy one form, leaving the other form unchanged. Even more attractive is the use of hydrolylase on a derivative of the racemic mixture to form preferentially one form of acid. Thus, esters or amides of the acids can be subjected to an esterase or amidase which will selectively saponify one enantiomorph and leave the other unchanged. Amide or salt diastereoisomers of the free acid may be formed with optically-active amines, such as quinine, brucine, cinchonidine, cinchonine, dehydroabietylamine, hydroxy-hydrindamine, menthylamine, morphine, α-phenylethylamine, phenyloxynaphthylmethylamine, quinidine, 1-fenchylamine, strychnine, basic amino acids, such as lysine, arginine, amino acid esters, and the like. Similarly, ester diastereoisomers of the free acid may be formed with optically-active alcohols, such as borneol, menthol, 2-octanol and the like. Especially preferred is the use of cinchonidine to give the readily decomposable diastereoisomer salt which may then be resolved by dissolving in a solvent, such as acetone, and distilling the solvent at atmospheric pressure until crystals begin to appear and further crystallization produced by allowing the mixture to cool to room temperature, thereby separating the two enantiomorphs. The acid may then be recovered from the salt by extracting the salt between an organic solvent, such as petroleum ether and dilute hydrochloric acid or some other organic solvent-aqueous system. Workup of the remaining mother liquors and subsequent purification will usually provide the other isomer.

Subsequent to the resolution of the carboxylic acids into their pure (+) and (−) isomers, the carboxylic acids are stereospecifically reduced with lithium aluminum hydride to the methanol derivatives without racemization (J. T. Brewster and J. G. Buta, J. Am. Chem. Soc., 88, 2233 (1966).

It is noted, however, the racemic mixtures of the methanols are themselves potent anti-inflammatory agents.

The compounds of this invention have a high degree of anti-inflammatory activity. They are useful in treating arthritis, rheumatism and other inflammatory diseases in mammals.

Anti-inflammatory tests of the compounsd of the present invention were carried out on rats using the carrageenin-induced foot edema test of Charles A. Winter et al., "Carrageenin-Induced Edema in Hind Paw of the Rat as an Assay for Anti-Inflammatory Drugs," Proceeding of the Society for Experimental Biology and Medicine, 111, 544 (1962). The compound under investigation was given orally to the rat, and one hour later carrageenin was injected subcutaneously into one paw. Three hours later the degree of edema was measured volumetrically by fluid displacement, and compared to that of the control paw to give a result presented in terms of percentage inhibition of edema. Any result of more than 30% inhibition was greater than three times the standard deviation of the result in control animals, and thus clearly indicated anti-inflammatory activity.

In the rat paw edema test described above, the compounds of the instant invention exhibit anti-inflammatory activity deemed useful in the treatment of inflammatory diseases in mammals, including man. The compounds of the invention are generally useful in the dosage range of about 0.1 mg./kg. to about 40 mg./kg. three to four times a day.

They can be administered orally or parenterally, but preferably orally. More specifically, the compounds of the instant invention are preferentially administered in dosages in the range of about 0.2 mg./kg. to about 30 mg./kg. three to four times a day.

The dosage will vary with the particular compound of the invention. For example, (±)-5-cyclohexyl-1-indanmethanol had a minimum effective dose (MED) of 5.0 mg./kg. (MED is defined as the dose which produces 30% inhibition of edema).

Resolution of (±)-5-cyclohexyl-1-indanmethanol into its (+) and (−) isomers showed that the levorotatory (−) isomer was the more potent having an MED of 2.0 mg./kg. as compared to the dextrorotatory (+) isomer which had an MED of >16 mg./kg.

The oral dosage in humans of the compounds of the present invention is in the range of about 0.2 mg./kg. to about 25 mg./kg. administered three or four times a day. The preferred human dosage is in the range of 0.2 mg./kg. to about 10 mg./kg. three to four times a day.

The compounds of the instant invention can be prepared by the utilization of one or more of the disclosed procedures above and they include among others:

6-chloro-5-cyclohexyl-1-indanmethanol,
6-bromo-5-cyclohexyl-1-indanmethanol,
6-iodo-5-cyclohexyl-1-indanmethanol,
6-fluoro-5-cyclohexyl-1-indanmethanol,
6-hydroxy-5-cyclohexyl-1-indanmethanol,
6-methoxy-5-cyclohexyl-1-indanmethanol,
6-amino-5-cyclohexyl-1-indanmethanol,
6-methyl-5-cyclohexyl-1-indanmethanol,
6-mercapto-5-cyclohexyl-1-indanmethanol, and
6-methylthio-5-cyclohexyl-1-indanmethanol.

Metabolic studies conducted on (−)-5-cyclohexyl-1-indanmethanol in rats indicated a small quantity of (−)-5-cyclohexyl-1-indancarboxylic acid was found in the blood following oral dosing. While this is not indicative that the acid is the active moiety, it does indicate that some of the methanol dervative is oxidized to the acid in vivo.

DESCRIPTION OF THE STARTING MATERIALS

Example 1

(A) p-Cyclohexylbenzaldehyde: [D. Bodroux and R. Thomassin, Compt. Rend., 205, 991 (1937)].—Titanium tetrachloride [A. Rieche, H. Gross, and E. Höft, Organic Syntheses, 47, 1 (1967)] (183 ml., 316 grams, 1.67 moles) was added slowly over a period of ten minutes and with constant stirring to a cooled (ice-water) solution of cyclohexylbenzene (160 grams, 1.0 mole) in methylene chloride (650 ml.). With continued stirring and cooling, dichloromethyl methyl ether (96 grams, 0.833 mole) was added dropwise over a period of 45 minutes. After the addition was complete, the mixture was stirred for thirty minutes with cooling, followed by 130 minutes at room temperature. The reaction mixture was poured onto ice. The organic layer was separated and the aqueous layer extracted with methylene chloride (3×250 ml.). The combined methylene chloride solution was washed with water (2× 400 ml.) and dried (sodium sulfate). The dried solution was reduced to dryness in a rotary evaporator to leave a brown oil (209 grams). The oil was distilled under reduced pressure. p-Cyclohexylbenzaldehyde (81.3 grams, 52%) was collected as the fraction with B.P. 98–100°/0.2 mm. [lit. D. Dodroux and R. Thomassin, Compt. Rend., 205, 991 (1937)— B.P. 159°/10 mm.]

(B) Diethyl p - cyclohexylbenzylidenemalonate.—A solution of p-cyclohexylbenzaldehyde (9.4 grams, 0.05 mole), diethyl malonate (8.01 grams, 0.05 mole), piperidine (0.5 gram), and glacial acetic acid (0.33 gram) in benzene (25 ml.) was heated under reflux for 18 hours [C. F. H. Allen and F. W. Spangler, "Organic Syntheses," Coll. vol. III, John Wiley and Sons, Inc., New York, N.Y., 1963, p. 377]. The liberated water was removed from the reaction mixture as it was formed. The cooled reaction mixture was diluted with benzene (25 ml.), washed with water (2× 25 ml.) followed by 1 N hydrochloric acid (25 ml.), water (25 ml.), saturated sodium bicarbonate solution (25 ml.), and water (25 ml.). The solution was dried (sodium sulfate) and concentrated in a rotary evaporator to leave a yellow oil (17.7 g.). The product was distilled under vacuum. Diethyl p-cyclohexylbenzylidenemalonate (11.7 grams, 71%) was collected as the fraction with B.P. 172–174°/0.01 mm.

Analysis.—Calc'd for $C_{20}H_{26}O_4$ (percent): C, 72.70; H, 7.93. Found (percent): C, 72.62; H, 7.94.

(C) Ethyl 3-cyano - 3 - (p-cyclohexylphenyl)propionate.—A solution of potassium cyanide (1.8 grams, 0.0277 mole) in water (4.5 ml.) was added quickly to a solution of diethyl p-cyclohexylbenzylidenemalonate (9.0 grams, 0.0272 mole) in 100% ethanol (90 ml.). The stirred mixture was heated by means of an oil bath maintained at about 70° for twenty hours [C. F. H. Allen and H. B. Johnson, "Organic Syntheses," Coll., vol. IV, John Wiley and Sons, Inc., New York, N.Y., 1963, p. 804]. The reaction mixture was allowed to cool to room temperature. The precipitated solid was removed by filtration. The filtrate was acidified with 10% hydrochloric acid (1.5 ml.) and then concentrated in a rotary evaporator. The residue was partitioned between chloroform (150 ml.) and water (50 ml.). The chloroform layer was separated, dried (sodium sulfate) and concentrated to leave a pale yellow oil (8.1 grams) which was distilled under reduced pressure. Ethyl 3 - cyano - 3-(p-cyclohexylphenyl)propionate (4.2 grams, 54%) was collected as the fraction with B.P. 160–161°/0.15 mm.

Analysis.—Calc'd for $C_{18}H_{23}NO_2$ (percent): C, 75.75; H, 8.12. Found (percent): C, 75.77; H, 8.28.

(D) p-Cyclohexylphenylsuccinic acid.—A mixture of ethyl 3 - cyano - 3-(p-cyclohexylphenyl)-propionate (3.0 grams), glacial acetic acid (10 ml.) and concentrated hydrochloric acid (10 ml.) was heated under reflux for three hours. A crystalline solid separated from the reaction mixture which was allowed to cool slowly. The solid (1.95 grams, 67%), with M.P. 178–182°, was recrystallized from aqueous ethanol followed by ethyl acetate to give the p-cyclohexylphenylsuccinic acid as colorless crystals, M.P. 188–189° C.

Analysis.—Calc'd for $C_{16}H_{20}O_4$ (percent): C, 69.54; H, 7.30. Found (percent): C, 69.54; H, 7.36.

(E) p - Cyclohexylphenylsuccinic anhydride.—A mixture of p-cyclohexylphenylsuccinic acid (10.0 grams) and acetic anhydride (50 ml.) was heated under reflux for 1.25 hours. The cooled solution was reduced to dryness in a rotary evaporator and the solid residue recrystallized from cyclohexane to give p - cyclohexylphenylsuccinic anhydride (8.8 grams, 94%) as colorless crystals, M.P. 116.5–118° C. The product was recrystallized from cyclohexane to give colorless crystals, M.P. 117–118.5° C.

Analysis.—Calc'd for $C_{16}H_{18}O_3$ (percent): C, 74.39; H, 7.02. Found (percent): C, 74.58; H, 7.24.

(F) (±)-5-cyclohexyl-3-oxo-1-indancarboxylic acid:

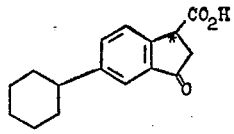

A solution of p - cyclohexylphenylsuccinic anhydride (33.0 grams, 0.128 mole) in dry methylene chloride (400 ml.) was added dropwise to a stirred, cooled (ice-water) suspension of aluminum chloride (37.4 grams, 0.281 mole) in methylene chloride (400 ml. [H. O. House, F. J. Sauter, W. G. Kenyon, and J. J. Riehl, J. Org. Chem., 33, 957 (1968)].

The mixture was stairred with cooling for one hour, and was then stirred at room temperature for twenty-four hours. The reaction mixture was reduced to dryness and the residue triturated with ice-water (500 ml.) and concentrated hydrochloric acid (30 ml.). The resulting gummy suspension was stirred for thirty-six hours at room temperature. The mixture was filtered and the collected off-white solid dried under vacuum. The solid was recrystallized from cyclohexane to give (±)-5-cyclohexyl-3-oxo-1-indancarboxylic acid (30.4 g., 92%) as off-white crystals, M.P. 117–118° C. A portion of the product was recrystallized (with charcoal treatment) from cyclohexane to give colorless crystals, M.P. 117–118° C.

Analysis.—Calc'd for $C_{16}H_{18}O_3$ (percent): C, 74.39; H, 7.02. Found (percent): C, 74.29; H, 7.23.

(G) (±)-5-cyclohexyl-1-indancarboxylic acid:

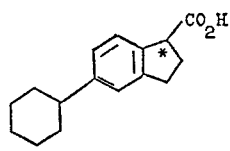

A solution of (±)-5-cyclohexyl-3-oxo-1-indancarboxylic acid (9.0 grams) in glacial acetic acid (150 ml.) containing 60% perchloric acid (2 ml.) and 10% palladium on carbon (2.0 grams) was shaken with hydrogen (Parr hydrogenator, 3 atmos.) until no further hydrogen was absorbed. The mixture was filtered and anhydrous sodium acetate (2.5 grams) was added to the filtrate. The resulting solution was reduced to dryness. Several portions of toluene were added to the residue and after each addition the mixture was evaporated. The residue was partitioned between diethyl ether (200 ml.) and water (40 ml.). The ether layer was washed with water (40 ml.) followed by saturated aqueous sodium chloride (40 ml.), and dried (sodium sulfate). The solution was reduced to dryness to yield a buff solid which was recrystallized from Skellysolve B to give (±)-5-cyclohexyl-1-indancarboxylic acid (8.4 grams, 98.5%) as buff crystals, M.P. 145–147° C. A portion of the product was recrystallized from Skellysolve B (essentially n-hexane, B.P. 60–68° C.), with charcoal treatment, to give colorless crystals, M.P. 147–148° C.

Analysis.—Calc'd for $C_{16}H_{20}O_2$ (percent): C, 78.65; H, 8.25. Found (percent): C, 78.58; H, 8.34.

EXAMPLE 2

Sodium 5-cyclohexyl-1-indancarboxylate(±)racemic mixture

A solution of sodium 2-ethylhexanoate (6.15 grams, 0.037 mole) in acetone (30 ml.) was added to a solution of (±) - 5 - cyclohexyl - 1 - indancarboxylic acid (9.0 grams, 0.0368 mole) in warm acetone (70 ml.). The mixture was allowed to stand and cool to room temperature. The crystalline solid (7.25 grams, 74%) that formed was collected, washed with acetone and recrystallized from methanol-acetone to give sodium 5-cyclohexyl-1-indancarboxylate as colorless crystals.

Analysis.—Calc'd for $C_{16}H_{19}NaO_2$ (percent): C, 72.16; H, 7.19. Found (percent): C, 72.11; H, 7.40.

EXAMPLE 3

(±)-6-chloro-5-cyclohexyl-1-indancarboxylic acid

N-chlorosuccinimide (8.2 grams, 0.0614 mole) was added to a stirred, cooled (ice-water) solution of (±)-5-cyclohexyl-1-indancarboxylic acid (10.0 grams, 0.0409 mole) in dimethylformamide (82 ml.). The solution was stirred for fifteen minutes at 0° C., thirty minutes at 25° C., nine hours at 50° C. followed by eight hours at 25° C. The solution was diluted with cold water (400 ml.) and stirred until the precipitated product turned granular (fifteen minutes). The crude product was collected, washed with cold water, and dried. Crystallization from Skellysolve B with charcoal treatment gave colorless crystals (6.65 grams, 58%), M.P. 149–150° C. The product was recrystallized twice from Skellysolve B to give (±) - 6 - chloro - 5 - cyclohexyl - 1 - indancarboxylic acid as colorless crystals, M.P. 150.5–152.5° C.

*Analysis.*—Calc'd for $C_{16}H_{19}ClO_2$ (percent): C, 68.94; H, 6.87; Cl, 12.72. Found (percent): C, 69.19; H, 7.04; Cl, 12.97.

EXAMPLE 4

Resolution of (±)-5-cyclohexyl-1-indancarboxylic acid (A) (+) - 5 - cyclohexyl - 1 - indancarboxylic acid.—A solution of (±)-5-cyclohexyl-1-indancarboxylic acid (15.0 grams, 0.0614 mole) and cinchonidine (9.05 grams, 0.0307 mole) in absolute ethanol (700 ml.) was boiled down to a volume of about 300 ml. The mixture was allowed to cool slowly and was left for twenty hours at 25° C. The colorless crystals were collected and washed with cold ethanol to give the cinchonidine salt of (+)-5-cyclohexyl-1-indancarboxylic acid (13.0 grams), M.P. 212–212.5° C. Additional cinchonidine (1.0 grams, 0.0034 mole) was added to the mother liquors and their volume reduced to about 165 ml. by boiling. The hot solution was seeded with the salt of the (+) acid and stored at 5° C. for sixty-five hours, when an additional crop (2.4 grams) of the cinchonidine salt of the (+) acid, M.P. 211–215° C. was obtained. The mother liquors were retained for isolation of the (−) isomer.

The salt with M.P. 212–212.5° C. was recrystallized from ethanol to give colorless crystals (11.8 grams), M.P. 217.5–219° C. The product was partitioned between ether (500 ml.) and 10% aqueous hydrochloric acid (250 ml.). The ethereal layer was washed successively with 10% aqueous hydrochloric acid (250 ml.) water (2× 250 ml.) and water saturated with sodium chloride (250 ml.). The ethereal solution was dried ($Na_2SO_4$), filtered, and the filtrate reduced to dryness to give (+)-5-cyclohexyl-1-indancarboxylic acid (5.5 grams), M.P. 108–110° C. Two recrystallizations from petroleum ether (B.P. 39–50° C.), gave colorless needles, M.P. 108–109.5° C., $[\alpha]_D^{25}+9.60°$ (ethanol), and $[\alpha]_{365}^{25}+44.8°$ (ethanol).

*Analysis.*—Calc'd for $C_{16}H_{20}O_2$ (percent): C, 78.65; H, 8.25. Found (percent): C, 78.40; H, 8.27.

(B) (−) - 5 - cyclohexyl - 1 - indancarboxylic acid.— The mother liquors from the salt formation in part A, were reduced to dryness and the residue treated with ether and 10% aqueous hydrochloric acid as previously described for the salt of the (+) isomer and from the ethereal layer was obtained a partially resolved mixture of acids (7.6 grams), enriched in the (−) isomer, $[\alpha]_D^{25}-7.69°$ (ethanol) and $[\alpha]_{365}^{25}-35.4°$ (ethanol). This mixture was extracted with boiling petroleum ether (B.P. 39–50° C., 3× 35 ml.) and the combined extracts were reduced in volume (50 ml.) and cooled in an ice bath. The crystalline solid (5.1 grams), M.P. 105–108° C., $[\alpha]_D^{25}-8.91°$ (ethanol) and $[\alpha]_{365}^{25}-41.5°$ (ethanol), was collected.

The solution of this acid (5.02 grams, 0.0205 mole) and dehydroabietylamine (5.85 grams, 0.0205 mole) in ethanol (500 ml.) was boiled down to a volume of about 175 ml. and cooled to 25° C. during two hours. The dehydroabietylamine salt of (−)-5-cyclohexyl-1-indancarboxylic acid (8.7 grams), M.P. 179–181° C., was collected and recrystallized from ethanol to give colorless crystals (8.0 grams), M.P. 184–185° C. The mother liquors from the product with M.P. 179–181° C., were reduced in volume and an additional crop of salt (0.95 gram), M.P. 178.5–180.5° C., was isolated. This latter material was recrystallized from ethanol and the product (0.78 gram), M.P. 182–183° C., was combined with the main crop. The dehydroabietylamine salt (8.78 grams) was partitioned between ether (400 ml.) and 10% aqueous hydrochloric acid. The ethereal solution was washed with water (3× 150 ml.) followed by water saturated with sodium chloride (2× 100 ml.), dried ($Na_2SO_4$), and reduced to dryness to leave the (−) isomer (4.0 grams). Recrystallization from petroleum ether (B.P. 39–50° C.) gave colorless needles (3.41 grams) of (−)-5-cyclohexyl-1-indancarboxylic acid: M.P. 108–109.5° C., $[\alpha]_D^{25}-9.66°$ (ethanol) and $[\alpha]_{365}^{25}-44.7°$ (ethanol).

*Analysis.*—Calc'd for $C_{16}H_{20}O_2$ (percent): C, 78.65; H, 8,25. Found (percent): C, 78.85; H, 8.31.

EXAMPLE 5

Resolution of (±)-6-chloro-4-cyclohexyl-1-indancarboxylic acid (A) (+)-6-chloro-5-cyclohexyl - 1 - indancarboxylic acid.—A solution of (±)-6-chloro-5-cyclohexyl-1-indancarboxylic acid (20.0 g., 0.0719 mole) and dehydroabietylamine (10.22 g., 0.03595 mole) in absolute ethanol (700 ml.) was boiled down to a volume of about 380 ml. The mixture was allowed to cool slowly and was left for 20 hours at about 25°. The resulting crystalline solid (16.3 g.), M.P. 188–190° C., was collected and recrystallized from methanol:water (20:1) to give colorless crystals (11.0 g.), M.P. 192–194° C. Recrystallization from methanol gave colorless crystals (7.4 g.), M.P. 194–195.5° C. The salt was partitioned between diethyl ether and 1 N hydrochloric acid. The ethereal layer was washed successively with 1 N hydrochloric acid (twice), water (twice), and water saturated with sodium chloride. The ethereal solution was dried ($Na_2SO_4$) and concentrated to give (+) - 6 - chloro - 5 - cyclohexyl - 1 - indancarboxylic acid (3.5 g.) as colorless crystals, M.P. 133–134° C. Recrystallization from Skellysolve B gave colorless needles (3.0 g.), M.P. 135–136° C., $[\alpha]_D^{25}+28.7°$ (ethanol) and $[\alpha]_{365}^{25}+88.7°$ (ethanol).

*Analysis.*—Calc'd for $C_{16}H_{19}ClO_2$ (percent): C, 68.94; H, 6.87; Cl, 12.72. Found (percent): C, 68.94; H, 6.81; Cl, 12.64.

(B) (−)-6-chloro-5-cyclohexyl - 1 - indancarboxylic acid.—A solution of (+)-5-cyclohexyl - 1 - indancarboxylic acid (8.0 g., 0.0328 mole) and N-chlorosuccinimide (6.52 g., 0.049 mole) in dimethylformamide (66 ml.) was heated, with stirring, by means of an oil bath maintained at 52–55° C. for 9 hours, followed by 32° for 10 hours. The solution was poured into water (280 ml.) and the mixture triturated with ice cooling. The resulting solid was collected, dried, and recrystallized from Skellysolve B (Norit) to give colorless crystals (3.12 g., 34%), M.P. 127–130° C. The product was recrystallized twice from petroleum ether (B.P. 30–60° C.) to give (−) - 6 - chloro - 5 - cyclohexyl - 1 - indancarboxylic acid as colorless crystals, M.P. 134–135° C., $[\alpha]_D^{25}-28.2°$ (ethanol) and $[\alpha]_{365}^{25}-87.5°$ (ethanol).

*Analysis.*—Calc'd for $C_{16}H_{19}ClO_2$ (percent): C, 68.94; H, 6.87; Cl, 12.72. Found (percent): C, 68.82; H, 6.86; Cl, 12.68.

EXAMPLE 6

(±)-5-cyclohexyl-6-nitro-1-indancarboxylic acid

A mixture of concentrated sulfuric acid (670 g.) and concentrated nitric acid (42.0 g. of 70%, 0.466 mole $HNO_3$) was added dropwise with stirring, to a cooled (ice-water) mixture of (±)-5-cyclohexyl-1-indancarboxylic acid (100.0 g., 0.409 mole) in nitromethane (1260 ml.) over a period of 70 minutes. The solution was then stirred for two hours with cooling, followed by 2.5 hours at 25°. The reaction mixture was poured onto ice. The resulting mixture was extracted with diethyl ether. The ether extract was washed with water, followed by aqueous sodium acetate, water, and saturated aqueous sodium chloride. The ether solution was then dried ($Na_2SO_4$) and concentrated. The residue was crystallized from nitromethane to give a tan solid (48.7 g.), M.P. 102–112° C. Recrystallization from benzene:Skellysolve B gave tan crystals, M.P. 112–115° C.

A portion of the product was purified by chromatography on silicic acid (Mallinckrodt CC-4, 100–200 mesh) with toluene:acetone (30:1). The product was finally recrystallized from benzene:Skellysolve B to give ($\pm$)-5 - cyclohexyl - 6 - nitro - 1 - indancarboxylic acid as pale yellow crystals, M.P. 118–120° C., resolidifying and remelting at 150–151° C.

*Analysis.*—Calc'd for $C_{16}H_{19}NO_4$ (percent): C, 66.42; H, 6.62; N, 4.84. Found (percent): C, 66.75; H, 6.72; N, 4.67.

EXAMPLE 7

($\pm$)-6-amino-5-cyclohexyl-1-indancarboxylic acid

A solution of ($\pm$)-5-cyclohexyl-6-nitro-1-indancarboxylic acid (14.0 g.) in 95% ethanol (200 ml.) containing Raney nickel was shaken with hydrogen at room temperature and an initial pressure of 3.5 kg./cm.$^2$ for 2.5 hours. The catalyst was removed by filtration and the filtrate concentrated to about half volume by boiling. After addition of a small volume of water to the hot solution, the ($\pm$) - 6 - amino - 5 - cyclohexyl - 1 - indancarboxylic acid (8.9 g.) crystallized as light green crystals, M.P. 103–114° C.

EXAMPLE 8

($\pm$)-5-cyclohexyl-6-hydroxy-1-indancarboxylic acid

A mixture ($\pm$) - 6 - amino - 5 - cyclohexyl - 1 - indancarboxylic acid (5.80 g., 0.0224 mole), water (50 ml.) and concentrated hydrochloric acid (50 ml.) was cooled to 0° and treated, with stirring, over a period of 45 minutes with sodium nitrite (1.70 g., 0.0246 mole) in water (5 ml.). Stirring was continued for 15 minutes at 25°, followed by 8 minutes at 80–90°. The mixture was cooled and extracted with diethyl ether. The ether solution was washed twice with water followed by saturated aqueous sodium chloride, and concentrated in a rotary evaporator. The residual gum was purified by chromatography on silicic acid (110 g. of Mallinckrodt CC-4, 100–200 mesh) with toluene:acetone (20:1). The product was recrystallized from benzene:Skellysolve B to give tan crystals (2.0 g.) M.P. 159–160°. The product was recrystallized twice from benzene:Skellysolve B to give ($\pm$) - 5 - cyclohexyl - 6 - hydroxy - 1 - indancarboxylic acid as tan crystals, M.P. 159.5–161°.

*Analysis.*—Calc'd for $C_{16}H_{20}O_3$ (percent): C, 73.82; H, 7.74. Found (percent): C, 74.00; H, 7.99.

EXAMPLE 9

($\pm$)-5-cyclohexyl-6-methoxy-1-indancarboxylic acid

A mixture of ($\pm$)-5-cyclohexyl-6-hydroxy-1-indancarboxylic acid (4.02 g., 0.0154 mole), dimethyl sulfate (4.29 g., 0.034 mole), and potassium carbonate (8.55 g., 0.0618 mole) in acetone (45 ml.) containing 10% potassium hydroxide in methanol (1 ml.) was heated under reflux for four hours and was then allowed to stand at 25° for 17 hours. The mixture was filtered and the filtrate concentrated in a rotary evaporator. The residual red oil (5.6 g.) was purified by chromatography on silicic acid (160 g. of Mallinckrodt CC-7, 100–200 mesh) with toluene.

A mixture of the yellow oil (3.3 g.) obtained from chromatography, 1 N NaOH (25 m.), and 95% ethanol (6 ml.) was heated under reflux for 35 minutes. The cooled solution was acidified with dilute hydrochloric acid. The precipitated crystalline solid (2.93 g.) M.P. 162–164°, was recrystallized from cyclohexane to give ($\pm$)-5-cyclohexyl-6-methoxy - 1 - indancarboxylic acid (2.72 g.) as pale yellow crystals, M.P. 167.5–169°.

*Analysis.*—Calc'd for $C_{17}H_{22}O_3$ (percent): C, 74.42; H, 8.08. Found (percent): C, 74.63; H, 8.28.

EXAMPLE 10

($\pm$)-5-cyclohexyl-6-fluoro-1-indancarboxylic acid

A suspension of ($\pm$)-6-amino-5-cyclohexyl-1-indancarboxylic acid (10.0 g., 0.0386 mole) in diethyl ether (70 ml.) was treated with an excess of ethereal diazomethane. The solution was filtered and the filtrate concentrated on a steam bath to give the methyl ester as an oil.

Fluoroboric acid (21.0 g. of 49%, 0.116 mole) was added to a solution of the ester in ethanol (10 ml.). To the cooled (ice-water) solution was added, with stirring, isoamyl nitrite (5.0 g., 0.0425) over a period of two minutes. The mixture was allowed to stand at 0° for 0.5 hour. The solution was then diluted with diethyl ether (150 ml.) and kept at −10° for 20 hours. The solid diazonium fluoroborate (9.0 g.) was collected and dried. A suspension of the diazonium salt in Skellysolve C (100 ml.) was heated under reflux for 0.5 hour. The mixture was filtered while still warm and the filtrate concentrated to give methyl ($\pm$)-5-cyclohexyl-6-fluoro - 1 - indancarboxylate (6.2 g.).

A mixture of the crude ester (6.2 g.), 1 N sodium hydroxide (50 ml.), and 95% ethanol (20 ml.) was heated under reflux for 0.5 hour. The hot solution was treated with Norit and filtered. The cooled filtrate was acidified with 1 N hydrochloric acid and the precipitated material extracted into diethyl ether. The ether solution was washed twice with water followed by saturated aqueous sodium chloride, and dried ($Na_2SO_4$). The dried solution was reduced to dryness and the residue recrystallized from Skellysolve B to give pale yellow crystals (4.4 g.), M.P. 137–141°. The product was purified by chromatography on silicic acid (Mallinckrodt CC-4, 100–200 mesh) with toluene-acetone (25:1), and finally recrystallized from aqueous ethanol to give ($\pm$)-5-cyclohexyl-6-fluoro-1-indancarboxylic acid (3.5 g.) as pale yellow crystals, M.P. 143–145.5°.

*Analysis.*—Calc'd for $C_{16}H_{19}FO_2$ (percent): C, 73.26; H, 7.30. Found (percent): C, 72.99; H, 7.40.

EXAMPLES OF THE EMBODIMENTS OF THE INVENTION

EXAMPLE 11

Preparation of ($\pm$)-5-cyclohexyl-1-indanmethanol

A solution of ($\pm$)-5-cyclohexyl-1-indancarboxylic acid (10.0 g., 0.0408 mole) in diethyl ether (100 ml.) was added to a stirred, cooled (ice-water) mixture of lithium aluminum (3.0 g., 0.0816) in diethyl ether (50 ml.) over a period of 5 minutes. The mixture was heated under reflux for 3 hours. The mixture was then cooled (ice-water) and treated cautiously with water (100 ml.) followed by concentrated hydrochloric acid (25 ml.). The ether layer was separated and washed successively with 10% hydrochloric acid (50 ml.), water (50 ml.), 1 N sodium hydroxide (50 ml.), water (50 ml.), and saturated aqueous sodium chloride (50 ml.). The solution was dried over sodium sulfate and concentrated to give an oil which was crystallized from n-pentane to give ($\pm$)-5-cyclohexyl-1-indanmethanol (8.73 g., 92.7%) as colorless crystals, M.P. 49–53°. The product was recrystallized twice from n-pentane to give colorless crystals, M.P. 52–53.5°.

*Analysis.*—Calc'd for $C_{16}H_{22}O$ (percent): C, 83.43; H, 9.63. Found (percent): C, 83.67; H, 9.79.

EXAMPLE 12

Preparation of (−)-5-cyclohexyl-1-indanmethanol

In a manner similar to that described in Example 11, (−)-5-cyclohexyl-1-indancarboxylic acid (2.0 g., 0.00816 mole) was treated with lithium aluminum hydride (0.6 g., 0.0163 mole). The crude product (1.82 g.) was recrystallized twice from n-pentane to give (—)-5-cyclohexyl-1-indanmethanol as colorless crystals, M.P. 51–52°, $[\alpha]_D^{25}$ —15.09° (c. 1.282, benzene).

*Analysis.*—Calc'd for $C_{16}H_{20}O$ (percent): C, 83.43; H, 9.63. Found (percent): C, 83.07; H, 9.59.

EXAMPLE 13

Preparation of (+)-5-cyclohexyl-1-indanmethanol

In a manner similar to that described in Example 11, (+)-5-cyclohexyl-1-indancarboxylic acid (2.0 g., 0.00816 mole) was treated with lithium aluminum hydride (0.6 g., 0.0163 mole). The crude product was crystallized from n-pentane to give colorless crystals (1.62 g.), M.P. 51–51.5°. Recrystallization from n-pentane gave (+)-5-cyclohexyl-1-indanmethanol as colorless crystals, M.P. 50–52°, $[\alpha]_D^{25}$ +15.22 (c. 1.472, benzene).

*Analysis.*—Calc'd for $C_{16}H_{22}O$ (percent): C, 83.43; H, 9.63. Found (percent): C, 83.31; H, 9.61.

EXAMPLE 14

Substitution in the procedure of Example 11 for the (±)-5-cyclohexyl-1-indancarboxylic acid used therein of an equimolar quantity of racemic or dextro or levorotatory 6-chloro-5-cyclohexy-1-indancarboxylic acid,
6-bromo-5-cyclohexyl-1-indancarboxylic acid,
6-iodo-5-cyclohexyl-1-indancarboxylic acid,
6-fluoro-5-cyclohexyl-1-indancarboxylic acid,
6-hydroxy-5-cyclohexyl-1-indancarboxylic acid,
6-methoxy-5-cyclohexyl-1-indancarboxylic acid,
6-amino-5-cyclohexyl-1-indancarboxylic acid,
6-methyl-5-cyclohexyl-1-indancarboxylic acid,
6-mercapto-5-cyclohexyl-1-indancarboxylic acid,
6-nitro-5-cyclohexyl-1-indancarboxylic acid or
6-methylthio-5-cyclohexyl-1-indancarboxylic acid
produces, respectively,
6-chloro-5-cyclohexyl-1-indanmethanol,
6-bromo-5-cyclohexyl-1-indanmethanol,
6-iodo-5-cyclohexyl-1-indanmethanol,
6-fluoro-5-cyclohexyl-1-indanmethanol,
6-hydroxy-5-cyclohexyl-1-indanmethanol,
6-methoxy-5-cyclohexyl-1-indanmethanol,
6-amino-5-cyclohexyl-1-indanmethanol,
6-methyl-5-cyclohexyl-1-indanmethanol,
6-mercapto-5-cyclohexyl-1-indanmethanol,
6-amino-5-cyclohexyl-1-indanmethanol or
6-methylthio-5-cyclohexyl-1-indanmethanol.

What is claimed is:

1. A compound having the formula

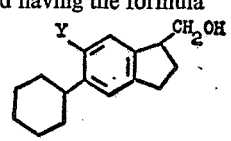

wherein Y is hydrogen, chloro, bromo, fluoro, (lower)-alkyl.

2. The compound of claim 1 wherein Y is hydrogen, chloro or (lower)alkyl.

3. The compound of claim 1 wherein Y is hydrogen.

4. The essentially pure levorotatory isomer of the compound of claim 3.

5. The essentially pure dextrorotatory isomer of the compound of claim 3.

6. (±)-6-chloro-5-cyclohexyl-1-indanmethanol.

7. The essentially pure dextrorotatory isomer of the compound of claim 6.

8. The essentially pure levorotatory isomer of the compound of claim 6.

References Cited

UNITED STATES PATENTS 2,857,433  10/1958  Bruson et al. ____ 260—618 F X

OTHER REFERENCES

Muller et al., Jour. Org. Chem., vol. 18 (1953), 1237–1245.

BERNARD HELFIN, Primary Examiner

U.S. Cl. X.R.

260—618 D, 613 R, 619 F, 609 D, 571, 609 F, 520, 519